US011442681B2

(12) United States Patent
Li et al.

(10) Patent No.: US 11,442,681 B2
(45) Date of Patent: Sep. 13, 2022

(54) FULL-SCREEN DISPLAY METHOD, RELATED DEVICES, AND SYSTEMS FOR UPRIGHT IMAGE

(71) Applicant: Actions Microelectronics Co., Ltd., Guangdong (CN)

(72) Inventors: Zhengfeng Li, Shenzhen (CN); Jianzhang Zheng, Guangdong (CN); Yingrui Li, Guangdong (CN)

(73) Assignee: Actions Microelectronics Co., Ltd., Guangdong (CN)

( * ) Notice: Subject to any disclaimer, the term of this patent is extended or adjusted under 35 U.S.C. 154(b) by 274 days.

(21) Appl. No.: 16/765,219

(22) PCT Filed: Nov. 29, 2019

(86) PCT No.: PCT/CN2019/122027
§ 371 (c)(1),
(2) Date: May 19, 2020

(87) PCT Pub. No.: WO2020/253123
PCT Pub. Date: Dec. 24, 2020

(65) Prior Publication Data
US 2021/0405950 A1 Dec. 30, 2021

(30) Foreign Application Priority Data
Jun. 17, 2019 (CN) .......................... 201910520739.8

(51) Int. Cl.
G06F 3/14 (2006.01)
G09G 5/391 (2006.01)
G06T 3/40 (2006.01)

(52) U.S. Cl.
CPC .......... *G06F 3/1423* (2013.01); *G06F 3/1454* (2013.01); *G06T 3/4053* (2013.01);
(Continued)

(58) Field of Classification Search
None
See application file for complete search history.

(56) References Cited

U.S. PATENT DOCUMENTS

2018/0070389 A1* 3/2018 Morgan .................... G09G 5/12
2022/0107673 A1* 4/2022 Silber .................. G06F 1/1694

FOREIGN PATENT DOCUMENTS

CN 102981793 A 3/2013
CN 106937100 A 7/2017
(Continued)

*Primary Examiner* — Joni Hsu
(74) *Attorney, Agent, or Firm* — The Webb Law Firm

(57) ABSTRACT

The present invention provides a full-screen display method for an upright image that includes the following steps: reading the resolution of the second image, the resolution of the second image is a:b; extracting from the said second image to generate the third image, the resolution of the third image is b:a; the center line of the second image and of the third image coincide in both the horizontal and vertical directions; the number of pixels of the second image in the vertical direction is the same as that of the third image in the vertical direction; rotating the third image by 90 degrees along the set direction generates the fourth image; and finally displaying the fourth image full-screen on the said display device. The present invention also provides the mirroring same-screen device, the display device, the full-screen display system for upright images, and the computer readable storage medium to perform the previous steps of the full-screen display method for upright images. Compared with related technologies, the technical scheme of the present invention can realize the full-screen display of an upright image with excellent user experience.

8 Claims, 6 Drawing Sheets

(52) U.S. Cl.
CPC ..... *G09G 5/391* (2013.01); *G09G 2340/0407* (2013.01); *G09G 2340/0414* (2013.01); *G09G 2340/0421* (2013.01); *G09G 2340/0442* (2013.01); *G09G 2340/0492* (2013.01)

(56) References Cited

FOREIGN PATENT DOCUMENTS

| | | |
|---|---|---|
| CN | 108446085 A | 8/2018 |
| CN | 109814828 A | 5/2019 |
| CN | 110262765 A | 9/2019 |

\* cited by examiner

S2

Transmit the second image to the display processing chip of the display device so that the third image can be extracted from the second image by the display processing chip according to the extraction resolution, and the extraction resolution is x:b —— S21

Figure 4

FULL-SCREEN DISPLAY METHOD, RELATED DEVICES, AND SYSTEMS FOR UPRIGHT IMAGE

CROSS-REFERENCE TO RELATED APPLICATIONS

This application is the United States national phase of International Application No. PCT/CN2019/122027 filed Nov. 29, 2019, and claims priority to Chinese Patent Application No. 201910520739.8 filed Jun. 17, 2019, the disclosures of which are hereby incorporated by reference in their entirety.

BACKGROUND OF THE INVENTION

Field of the Invention

This invention is related to the technical field of display devices, specifically a full-screen display method for upright images, a mirroring same-screen device, a display device, a full-screen display system for upright images, and a computer readable storage medium.

Description of Related Art

At present, the wider application of mobile terminals, especially those represented by smart phones, has become an increasingly important part of people's lives, with more and more people using smart phones and large screen display devices for mirroring same-screen displays. The mirroring same-screen connects a mobile terminal with a display device in either a wired or wireless manner and displays the mirror image of the mobile terminal on the display device; wherein the vertical screen image resources of the mobile terminals are more than before, such as network streaming video and audio (WeChat video, Tik Tok, etc.).

As shown in FIG. 1, the mirroring same-screen device of the related technology generally converts the image of a mobile terminal into a horizontal screen image with the principle of filling the black edges at both ends in the horizontal direction of the image on the mobile terminal to generate a new horizontal screen image that conforms to the resolution of the horizontal screen display of the display device.

However, the mirror image transmitted to the display device by the same-screen device currently in use is a landscape image; when the display device is a portrait type, the displayed image cannot be converted to a full-screen display for an upright image, thus affecting the user's experience due to poor viewing. Furthermore, a third-party application program is currently used on the mirroring same-screen device to capture the screen display area (eliminating the black edge) and then transmit it to the display device to realize a full-screen effect. However, such third-party applications increase the power consumption and memory, and users often experience problems with software compatibility and interface, which lead to poor user experience.

Therefore, providing a new method, device, and system is necessary to solve the above technical problems.

SUMMARY OF THE INVENTION

An objective of the present invention is to overcome the technical problems mentioned above and provide a full-screen display method for upright images, a mirroring same-screen device, a display device, a full-screen display system for upright images, and a computer readable storage medium, all of which can realize the full-screen display of upright images and provide a good user experience.

To achieve the aforementioned objective, the present invention provides a full-screen display method for upright images. The mirroring same-screen device comprises a receiving end and a transmitting end to receive the first image displayed in landscape mode; the display device comprises a video input end connected to the transmitting end, and the mirroring same-screen device generates the second image in portrait mode by processing the first image data and transmitting the second image to the video input end through the transmitting end so that the image can be displayed on the display device. The full-screen display method for upright images is applied to the transmitting end or the video input end and includes the following steps:

Read the resolution of the second image and the resolution of the said second image is a:b, wherein a is the horizontal pixel scaling factor of the second image and b is the vertical pixel scaling factor of the second image;

Extract from the second image to generate the third image and the resolution of the third image is b:a, wherein b is the horizontal pixel scaling factor of the third image and a is the vertical pixel scaling factor of the third image; the center lines of the second image and third image coincide in both the horizontal and vertical directions, and the number of pixels of the second image in the vertical direction is the same as that of the third image in the vertical direction;

Rotate the third image by 90 degrees along the set direction to generate the fourth image;

Display the fourth image full screen and in portrait mode on the display device.

Better still, the extraction takes the center line of the second image as the center line of the third image and captures the images with resolution of x:b, where x is the horizontal pixel scaling factor, b is the vertical pixel scaling factor, and x satisfies the following formula:

$$x = \frac{b^2}{a}$$

Furthermore, the steps of the full-screen display of the fourth image on the display device include the following:

Transmit the second image to the display processing chip of the display device so that the display processing chip extracts the third image from the second image according to the extraction resolution. Said extraction resolution is x:b, where x is the horizontal pixel scaling factor, b is the vertical pixel scaling factor, and x satisfies the following formula:

$$x = \frac{b^2}{a}$$

The mirroring same-screen device is a mobile terminal, and the mobile terminal is a smart phone or a tablet computer.

Moreover, the mirroring same-screen device is connected to the display device in either a wired or a wireless mirroring same-screen manner.

The present invention also provides a mirroring same-screen device, which comprises a processor and a memorizer; the processor is used to read the programs in the memorizer to perform the steps of the full-screen display method for upright images as previously stated.

The present invention further includes a full-screen display system for upright images, which comprises the aforementioned mirroring same-screen device and a display device that receives the image transmitted by the mirroring same-screen device and displays it in portrait mode.

The present invention also provides a display device, which includes a processor and a memorizer; the processor is used to read the programs in the memorizer to perform the steps of the full-screen display method for upright images as previously stated.

The present invention further provides a full-screen display system for upright images, which comprises the mirroring same-screen device and the aforementioned display device that receives the image transmitted by the mirroring same-screen device and displays it in portrait mode.

The present invention also provides a computer-readable storage medium that stores the program of the full-screen display method for upright images, and any of the steps of the full-screen display method for upright images can be carried out when the processor implements said program.

Compared to prior art, the full-screen display method for upright images of the present invention includes the following steps: reading the resolution of the second image and the resolution of the said second image is a:b; extracting from the second image to generate the third image and the resolution of the third image is b:a; the center line of the second image and that of the third image coincide in both the horizontal and vertical directions; the number of pixels of the second image in the vertical direction is the same as that of the third image in the vertical direction; and displaying the said third image on the display device. This method extracts the image directly from the second image displayed in landscape mode according to the resolution of the portrait display, which not only satisfies the full-screen display for upright images on the display device, but also extracts the first image for a better viewing effect. Therefore, the technical scheme of the present invention can realize the full-screen display of upright images while providing a good user experience.

BRIEF DESCRIPTION OF THE DRAWINGS

To more clearly illustrate the technical scheme embodied in the present invention, the figures to be used in describing the embodiments are briefly introduced below. The figures described below are only some embodiments of the present invention, from which those having ordinary skills in the art could obtain other figures without creative work, in which:

FIG. 4 is a flowchart for the embodiment of step S2 in FIG. 3;

DESCRIPTION OF THE INVENTION

The technical scheme in the embodiments of the present invention are clearly and completely described in conjunction with the accompanying figures in the embodiments of the present invention. The embodiments described are only part of the embodiments of the present invention, not all of them. Based on the embodiments of the present invention, all other embodiments acquired by those having ordinary skills in the art without creative work belong to the scope of protection of the present invention.

Figure 2:
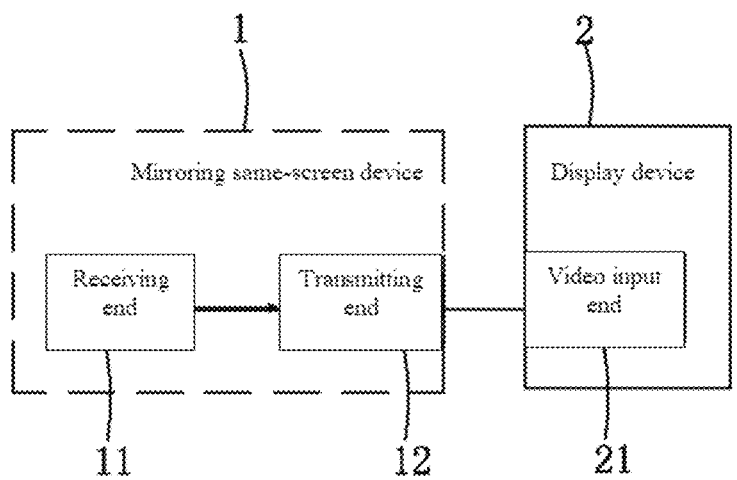
FIG. 2 is a block diagram of the full-screen display system for upright images of the present invention.

Referring to FIG. 2, which depicts a block diagram of the full-screen display system for upright images of the present invention. The present invention provides a full-screen display system 100 for upright images, which comprises the mirroring same-screen device 1 and the display device 2. The mirroring same-screen device 1 includes the receiving end 11 and the transmitting end 12 to receive the first image displayed in portrait mode. The display device 2 includes a video input end 21 connected to the transmitting end 12.

Figure 1:
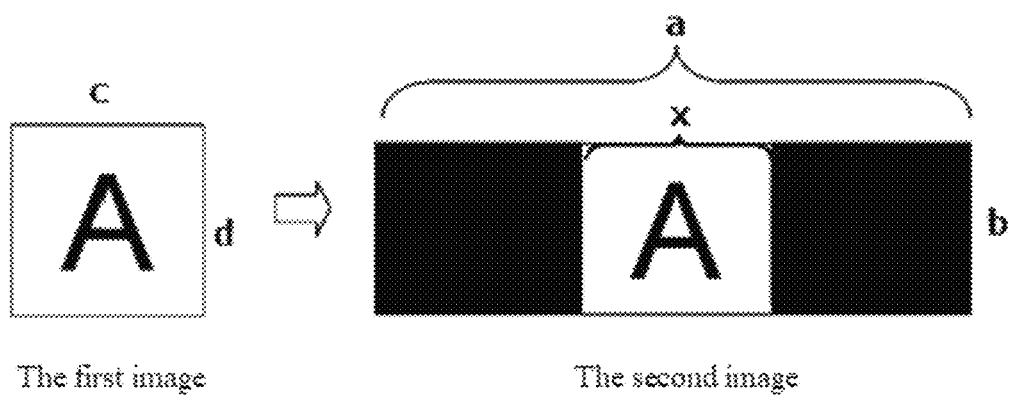
FIG. 1 is a schematic diagram for converting the first image into the second image.

The mirroring same-screen device 1 generates the second image in landscape mode by processing the first image data and transmits the second image to the video input end 21 through the transmitting end 12 in order to display it on the display device 2. The second image includes the first image, which maintains the original proportion of the image, that is, the black edges at both ends in the horizontal direction of the first image are filled to generate the second image in landscape mode, which conforms to the landscape resolution of the display device 2. As shown in FIG. 1, the resolution of the first image is c:d, and the resolution of the second image is a:b, where the first image maintains the original proportion of the image and satisfies the following formula:

$$\frac{c}{d} = \frac{x}{b}$$

In the present embodiment, the mirroring same-screen device is a mobile terminal, which is a smart phone or tablet computer. It can be understood, it is not limited to these devices, and the mirroring same-screen device can also be an independent device that receives and processes the first image transmitted by the mobile terminal, then generates the second image, and transmits it to the display device 2 for display.

The mirroring same-screen device 1 is connected to the display device 2 in a wired or wireless mirroring same-screen mode.

The display device 2 receives the image transmitted by the mirroring same-screen device 1 and displays the image in portrait mode. The display device 2 is a computer monitor, liquid crystal television, or projector.

Figure 3:
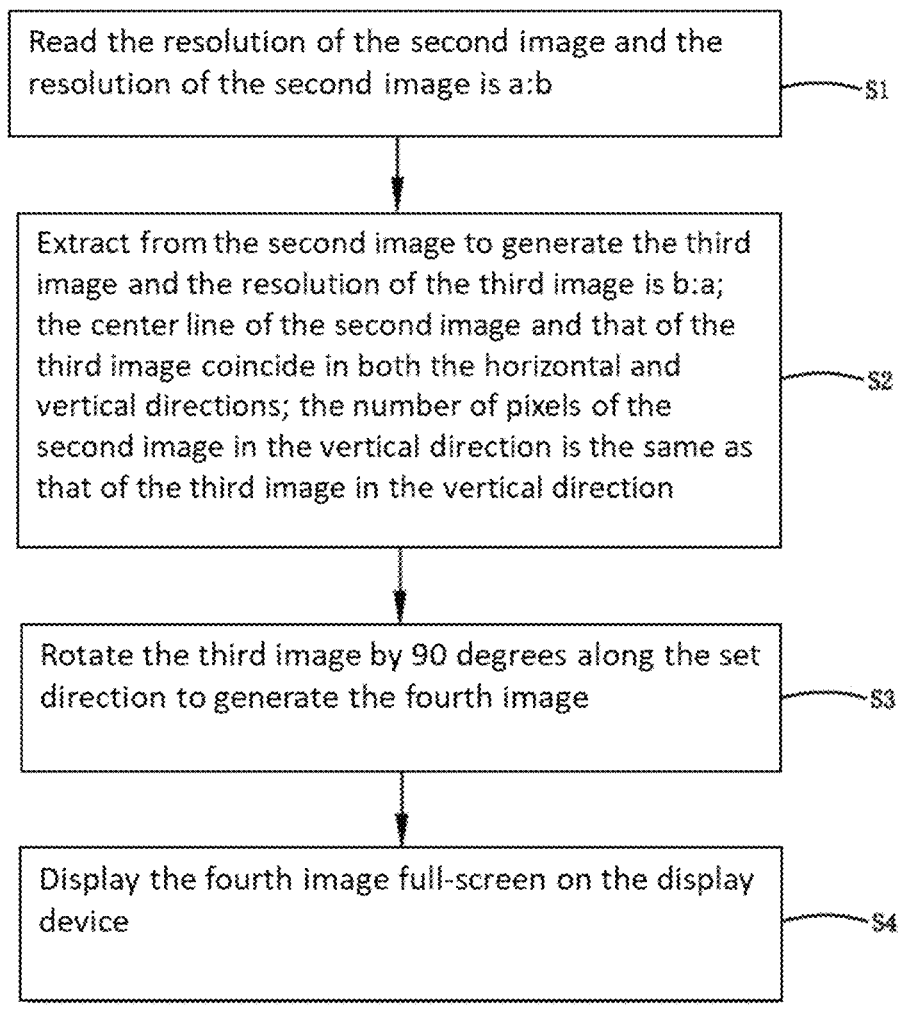
FIG. 3 is a flowchart of the full-screen display method for upright images of the present invention.

As shown in FIG. 3, the present invention provides a full-screen display method for upright images, which is applied to the mirroring same-screen device 1; the full-screen display method for upright images is applied to the transmitting end 12 or the video input end 21 using the following steps:

Step S1: Read the resolution of the second image and the resolution of the second image is a:b, where a is the horizontal pixel scaling factor of the second image and b is the vertical pixel scaling factor of the second image.

The first image is received or invoked by the receiving end 11 of the mirroring same-screen device 1, and the second image is transmitted to the display device 2 by the transmitting end 12 of the mirroring same-screen device 1. The mirroring same-screen device 1 can obtain the optimal resolution of the display device 2, that is, the resolution of the second image, by means of a handshake protocol. Of course, in this specific implementation, the resolution of the second image can also be directly invoked, which is more efficient.

Step S2: Extract the second image to generate the third image with a resolution of b:a, where b is the horizontal pixel scaling factor of the third image and a is the vertical pixel scaling factor of the third image. The center line of the second image and that of the third image coincide in both the horizontal and vertical directions, and the number of pixels of the second image in the vertical direction is the same as that of the third image in the vertical direction.

As shown in FIG. 1, the extraction takes the center line of the second image as the center line of the third image and captures the image with resolution x:b, where x is the horizontal pixel scaling factor, b is the vertical pixel scaling factor, and x satisfies the following formula:

$$x = \frac{b^2}{a}$$

The resolution is x:b, and the resolution of the third image is b:a through substitution into the above formula.

Since the resolution c:d of the first image cannot be directly derived from the resolution a:b of the second image, the full-screen display method for an upright image of the present invention directly extracts from the resolution a:b of the second image by using the best resolution of the display device 2, that is, the resolution b:a of the portrait display.

For example, the pixels of the second image are 1600:900, and the pixels of the third image are (8100/16):900. In the vertical direction, the pixels of the second image and the third image are both 900.

As shown in FIG. 4, the third image is extracted by the display processing chip of the display device 2 in the present embodiment; in particular, the step S2 includes the following:

Step S2-1: Transmit the second image to the display processing chip of the display device 2 so that the display processing chip can extract the third image from the second image according to the extraction resolution. The extraction resolution is x:b, where x is the horizontal pixel scaling factor, b is the vertical pixel scaling factor, and x satisfies the following formula:

$$x = \frac{b^2}{a}$$

The display processing chip (Scale in English) stretches or compresses the image to achieve the arbitrary resolution. For example, the 4:3 image is displayed on the display device 2 (such as the displayer) of 16:9 (full screen, but not too much in geometric distortion), and each of the display devices has a function. The use of the display processing chip in the step S2-1 can strengthen the data processing capability of the mirroring same-screen device 1 and reduce the memory needed, thus allowing for easier implementation. It can be understood that the aforementioned should not be limited, the mirroring same-screen device 1 can also internally realize the function and operation of the extraction through the chips or software.

Figure 5:
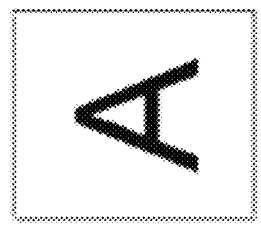
FIG. 5 is a schematic diagram of the fourth image of the present invention.

Step S3: Rotate the third image by 90 degrees along the set direction to generate the fourth image. As shown in FIG. 5, the resolution of the fourth image is the same as that of the display device 2 in portrait mode, which is good for the portrait display. The third image in landscape mode can be converted into the fourth image in portrait mode along the set direction of either clockwise or counterclockwise.

Step S4: Display the fourth image full-screen and in portrait mode on the display device 2. The display device 2 displays the third image full-screen according to a resolution of b:a, where the display device 2 enlarges the fourth image to full-screen and then displays the enlarged image.

Figure 6:
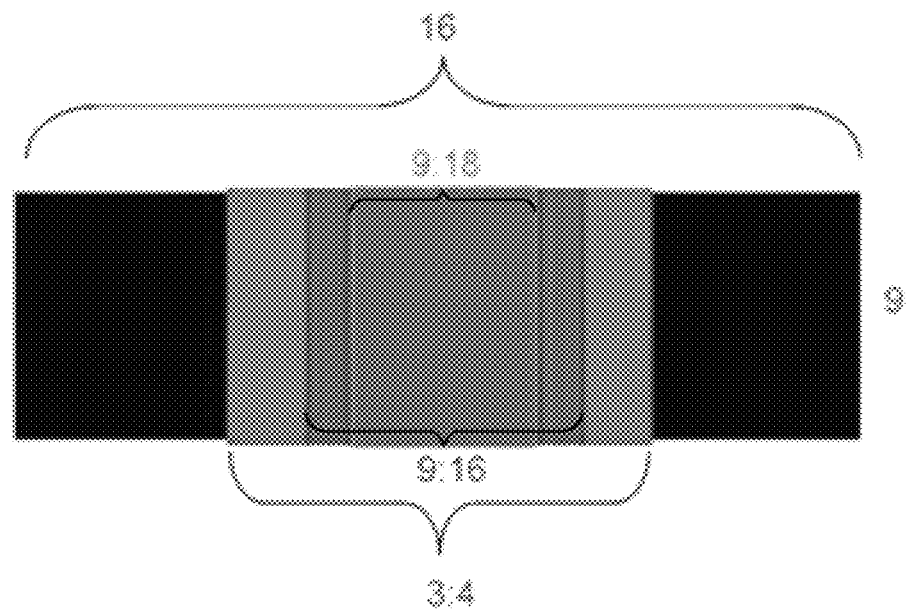
FIG. 6 is a schematic diagram for extracting the third image from the second image of the present invention.

As shown in FIG. 6, the best resolution of the display device 2 is 9:16 in portrait mode, the resolution of the second image is 16:9 in landscape mode, and the mirroring same-screen device 1 extracts the third image from the second image with the resolution of 16:9.

Figure 7:
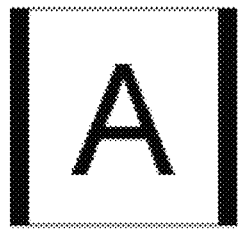
FIG. 7 is a schematic diagram for the embodiment of the third image of the present invention.

As shown in FIG. 7, when the resolution of the first image is smaller than the optimal resolution 9:16 of the display device 2, taking the resolution of the first image 9:18 as an example, the mirroring same-screen device 1 extracts the third image with the full-screen display method for upright images of the present invention, which is the first image with black edges filled on both sides in the horizontal direction.

Figure 8:
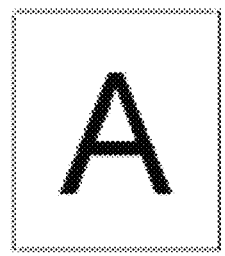
FIG. 8 is a schematic diagram for the second embodiment of the third image of the present invention.

As shown in FIG. 8, when the resolution of the first image equals the optimal resolution 9:16 of the display device 2, taking the resolution of the first image 9:16 as an example, the mirroring same-screen device 1 extracts the third image with the full-screen display method for upright images of the present invention, which is a full-frame display image.

Figure 9:
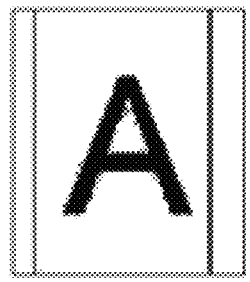
FIG. 9 is a schematic diagram for the third embodiment of the third image of the present invention.

As shown in FIG. 9, when the resolution of the first image is larger than the optimal resolution 9:16 of the display device 2, taking the resolution of the first image 3:4 as an example, the mirroring same-screen device 1 extracts the third image with the full-screen display method for upright images of the present invention, which is the middle part of the first image.

The above examples show that the full-screen display method for upright images of the present invention can effectively realize the full-screen display of the upright image, and the said third image is perfectly displayed full-screen on the display device 2 in portrait mode, which creates an excellent user experience.

The full-screen display method for upright images of the present invention can be applied to different devices and systems; relevant details are as follows:

Application 1: Mirroring Same-Screen Devices and Related Systems:

The present invention also provides a mirroring same-screen device, which comprises a processor and a memorizer; the processor is used to read the programs in the memorizer to perform the steps of the full-screen display method for upright images as previously stated.

The present invention further includes a full-screen display system for upright images, which comprises the above-mentioned mirroring same-screen device and a display device that receives the image transmitted by the mirroring same-screen device and displays the image in portrait mode.

Application 2: Display Devices and Related Systems:

The present invention also provides a display device, which comprises a processor and a memorizer; the processor is used to read the programs in the memorizer to perform the aforementioned steps of the full-screen display method for upright images.

The present invention also has a full-screen display system for upright images, which comprises the mirroring same-screen device and the aforementioned display device that receives the image transmitted by the mirroring same-screen device and displays the image in portrait mode.

The present invention also provides a computer-readable storage medium that stores the program of the full-screen display method for upright images, and any of the steps of the full-screen display method for upright images can be carried out when the processor implements the program.

Compared with the prior art, the full-screen display method for upright images of the present invention includes the following steps: reading the resolution of the second image and the resolution of the said second image is a:b; extracting from the second image to generate the third image and the resolution of the third image is b:a; the center line of the second image and that of the third image coincide in both the horizontal and vertical directions; the number of pixels of the second image in the vertical direction is the same as that of the third image in the vertical direction; and displaying the said third image on the display device. This method directly extracts the image from the second image displayed in landscape mode according to the resolution of the portrait display, which not only satisfies the full-screen display for upright images on the display device, but also extracts the first image for a better viewing effect. Therefore, the technical scheme of the present invention can realize the full-screen display of upright images and provide a good user experience.

The above explanation is only the embodiment of the present invention, and it should be pointed out here that for those having ordinary skills in the art, improvements can be made without departing from the inventive concept of the present invention, while still belonging to the scope of protection of the invention.

The invention claimed is:

1. A full-screen display method for upright images, the mirroring same-screen device comprises a receiving end and a transmitting end to receive the vertical screen's first displayed image; the display device includes a video input end that is connected to the transmitting end; the mirroring same-screen device generates the second image in landscape mode by processing the first image's data and then transmits the second image to the video input end using the transmitting end in order to show it on the display device; the full-screen display method of an upright image is applied to the transmitting end or the video input end, and the method comprises the following steps:

reading the resolution of the second image and the resolution of the said second image is a:b, wherein a is the horizontal pixel scaling factor of the second image and b is the vertical pixel scaling factor of the second image;

extracting from the second image to generate the third image and the resolution of the third image is b:a, wherein b is the horizontal pixel scaling factor of the third image and a is the vertical pixel scaling factor of the third image, the center line of the second image and of the third image coincide in both the horizontal and vertical directions, and the number of pixels of the second image in the vertical direction is the same as that of the third image in the vertical direction;

rotating the third image by 90 degrees along the set direction to generate the fourth image; and displaying the fourth image full-screen and in portrait mode on the display device;

wherein the extraction is taking the center line of the second image as that of the third image and intercepting the image with resolution of x:b; wherein x is the horizontal pixel scaling factor, b is the vertical pixel scaling factor, and x satisfies the following formula:

$$x = \frac{b^2}{a}.$$

2. The full-screen display method for upright images according to claim 1, wherein displaying the full-screen display of the fourth image on the display device includes the following steps:

transmitting the second image to the display processing chip of the display device so that the third image can be extracted from the second image by the display processing chip according to the extraction resolution, the extraction resolution is x:b, wherein x is the horizontal pixel scaling factor, b is the vertical pixel scaling factor, and x satisfies the following formula:

$$x = \frac{b^2}{a}.$$

3. The full-screen display method for upright images according to claim 1, wherein the mirroring same-screen device being a mobile terminal, the mobile terminal is a smart phone or a tablet computer.

4. The full-screen display method for upright images according to claim 1, wherein the mirroring same-screen device being connected to the display device in a wired or wireless manner.

5. A mirroring same-screen device comprising a processor and a memorizer, the processor is used to read the programs in the memorizer to perform the steps of the full-screen display method for upright images as claimed in claim 1.

6. A full-screen display method for upright images comprising the mirroring same-screen device of claim 5 and a display device that receives the image transmitted by the mirroring same-screen device and displays the image in portrait mode.

7. A display device comprising a processor and a memorizer, the processor is used to read the programs in the memorizer to perform the steps of the full-screen display method for upright images as claimed in claim 1.

8. A non-transitory computer-readable storage medium, wherein the non-transitory computer-readable storage medium can store a program of the full-screen display method for upright images, and the steps of the full-screen display method for upright images as claimed in claim 1 can be carried out when the processor implements said program.

* * * * *